US006976813B2

(12) United States Patent
Shinoda

(10) Patent No.: US 6,976,813 B2
(45) Date of Patent: Dec. 20, 2005

(54) ENGRAVING METHOD, ENGRAVER CUTTER HOLDING ASSEMBLY, AND ENGRAVER

(75) Inventor: Yasuko Shinoda, Tokyo (JP)

(73) Assignees: Shinoda Co., Ltd., Tokyo (JP); Shinkosya Co., Ltd., Aichi (JP)

( * ) Notice: Subject to any disclaimer, the term of this patent is extended or adjusted under 35 U.S.C. 154(b) by 90 days.

(21) Appl. No.: 10/375,396

(22) Filed: Feb. 27, 2003

(65) Prior Publication Data

US 2003/0170086 A1 Sep. 11, 2003

(30) Foreign Application Priority Data

Mar. 5, 2002 (JP) ............................ 2002-058470
Jul. 2, 2002 (JP) ............................ 2002-192812

(51) Int. Cl.[7] ............................ B23C 1/16; B23C 1/18
(52) U.S. Cl. ............................ 409/86; 409/88; 409/89; 409/201
(58) Field of Search ............................ 409/86, 88, 89, 409/93, 290, 313, 304, 201; 33/18.1

(56) References Cited

U.S. PATENT DOCUMENTS 2,330,566 A * 9/1943 Edmonds et al. ........... 409/109
5,697,739 A * 12/1997 Lewis et al. ................ 409/230
6,825,630 B2 * 11/2004 Katoh et al. ................... 29/40

OTHER PUBLICATIONS

Tools & Equipment 2003, Rio Grande, U.S.A., 2003, pp. 272-273.
Engraving Machine, Gravograph Co. Ltd., Japan., May 2004.
Tools & Equipment, Harp Co., Ltd., Japan, 2000, page 1.
Catalog of Engraving Machine, Accessories and Spare Parts.

* cited by examiner

*Primary Examiner*—Boyer D. Ashley
*Assistant Examiner*—Dana Ross
(74) *Attorney, Agent, or Firm*—Osha•Liang LLP

(57) ABSTRACT

A cutter holder assembly for holding a cutting tool supported at a tool carriage moving in at least an X-Y plane and provided with a cutter for engraving an item to be engraved includes a mounting base capable of being fitted to the tool carriage, a holder base supported at the mounting base in such a manner as to be freely moveable along a Z-axis provided in direction of a prescribed straight line, and a cutting tool holder having a cutting tool support supporting the cutting tool and being fixed to the holder base. Rotation of the cutting tool holder about the Z-axis with respect to the mounting base is restrained and an angle of inclination θ constituted by an angle formed when a longitudinal axis of the cutter and the Z-axis intersect can be held at a prescribed angle. It is therefore possible to provide a cutter holder assembly for an engraver capable of implementing engraving technology capable of a variety of types of engraving of a wide variation without limitation at a part to be engraved.

9 Claims, 17 Drawing Sheets

ENGRAVING METHOD, ENGRAVER CUTTER HOLDING ASSEMBLY, AND ENGRAVER

FIELD OF THE INVENTION

The present invention relates to engraving technology, and in particular relates to engraving technology for engraving characters and patterns onto surfaces such as metal, stone, glass, ceramics, shells etc. in order to work on the surfaces of jewelry such as rings etc., accessories, and gifts.

BACKGROUND OF THE INVENTION

In the related art, pantograph-type engravers where engraving takes place as a result of tracing a master using a link mechanism so as to move a cutting tool and personal computer-type engravers where a personal computer exerts control to engrave by moving a cutting tool are used when engraving characters on the surface of an accessory.

The pantograph engravers will be described in the following based on the drawings. FIG. 1 is a perspective view of a related assembly. FIG. 2 is a plan view of the related assembly.

Characters 3 on a copy type (master) 2 are traced using a stylus 47, movement of the stylus 47 is emulated so as to be reduced by a pantograph-type link mechanism 4 and conveyed to the movement of the cutting tool. The blade tip of a cutter 21 of the cutting tool then scratches a part to be engraved 55 of the accessory so as to engrave characters.

During this time, the cutting tool is manually pressed against the part to be engraved 55 and the surface of the metal is scratched by the blade tip of the cutter. Engraving depth of the characters engraved in the part to be engraved 55 is then decided by the magnitude of this pressing force.

In the method where the cutting tool is manually pressed against the part to be engraved 55, it is difficult for the pressure exerted by the blade tip of the cutter to be made greater than a prescribed value and skill is therefore required to engrave deeply.

A resistance force is generated in the horizontal direction when the cutting tool presses against the part to be engraved and the blade tip of the cutter moves. This resistance force is transmitted to the stylus via the pantograph-type link mechanism. When deeply inscribing engraving is carried out, the stylus is moved against a large resistance force and a smooth operation is difficult.

When engraving on the inner surface of a ring, it is difficult to bring the blade tip of the cutter close to the part to be engraved in a perpendicular manner and is therefore difficult for a large pressure to be made to act at the blade tip, which makes deeply inscribed engraving difficult.

With the method and configuration where engraving takes place by pressing a blade tip of a cutter perpendicularly to the part to be engraved, the cross-sectional shape of the engraving is uniquely decided by the shape of the blade tip of the cutter and it is easy for the cross-sectional shape inscribed when engraving to become tedious.

In this engraving technology of the related art, it is difficult to change the engraving depth and engraving shape more than this. It is therefore desirable in the future to develop engraving technology that is able to flexibly perform deep engraving regardless of the shape of parts to be engraved such as plane surfaces or curved surfaces. It is also desirable to be able to easily engrave whatever the location of the parts to be engraved and to be able to provide variation to the cross-sectional shape of the inscribed engraving. It is further desirable to be able to provide elegant and expressive engraving and provide widely varying engraving that is not limited by the parts to be engraved.

The present invention is provided in order to resolve the problems described above and as such provides an engraving method, cutter holding assembly for an engraver, and engraver, implementing engraving technology capable of a variety of types of engraving of a wide variation without limitation at a part to be engraved so as to replace the engraving method, cutter holding assembly for an engraver, and engraver of the related art.

SUMMARY OF INVENTION

In the present invention, a method for engraving an item to be engraved using an engraver comprises the steps of: fitting a cutter holding assembly, having a posture capable of being adjusted with respect to the item to be engraved, to the engraver; fitting a cutting tool to the cutter holding assembly in a detachable manner; and engraving the item to be engraved using the cutting tool.

In a preferred embodiment, a further step is provided where the axial center of a cutter of the cutting tool is adjusted so as to become inclined with respect to a surface to be engraved of the item to be engraved.

In a further preferred embodiment, the surface to be engraved of the item to be engraved may be flat, may be an outer surface of a ring, or may be an inner surface of a ring.

In a still further preferred embodiment, the cutter of the cutting tool can be made to rotate by a motor or driven by an ultrasonic oscillator.

In a still further preferred embodiment, the cutter holding assembly is fitted to a pantograph mechanism of a pantograph-type engraver or to a carriage of a personal computer-driven engraver.

Further, in the present invention, there is provided a cutter holding assembly for holding a cutting tool fitted to an engraver for engraving an item to be engraved, said assembly comprising: a mounting base capable of being fitted to an engraver tool carriage; a moving base fitting to the mounting base in such a manner as to be able to move freely in the direction of a straight line; a holder support supported at the moving base and enabling a position in the direction of the straight line and a rotation angle about the straight line to be changed; and a cutting tool holder, supported at the holder support via a distance adjustment mechanism capable of advancing and retreating in a direction perpendicular to the straight line, capable of adjusting a rotation angle about an axis perpendicular to the straight line, and having a cutting tool holder supporting the cutting tool in a detachable manner.

With the cutter holder assembly in a preferred embodiment, the tool carriage is one of a pantograph of a pantograph-type engraver or a two-dimensionally or three-dimensionally moving carriage of an engraver outputting engraving data using a personal computer.

Further, an engraver for engraving an item to be engraved of the present invention comprises: a cutting tool; a mounting base capable of being fitted to an engraver tool carriage; a moving base fitting to the mounting base in such a manner as to be able to move freely in the direction of a straight line; a holder support supported at the moving base and capable of adjusting a position in the direction of the straight line and a rotation angle about the straight line; and a cutting tool holder, supported at the holder support via a distance adjustment mechanism capable of advancing and retreating in a direction perpendicular to the straight line, capable of adjusting a rotation angle about an axis perpendicular to the straight line, and supporting the cutting tool in a detachable manner.

Further, in the present invention, a cutter holder assembly for holding a cutting tool supported at a tool carriage moving in at least an X-Y plane and provided with a cutter for engraving an item to be engraved, said assembly comprises: a mounting base capable of being fitted to the tool carriage; a holder base supported at the mounting base in such a manner as to be freely moveable along a Z-axis provided in direction of a prescribed straight line; and a cutting tool holder having a cutting tool support supporting the cutting tool and being fixed to the holder base, wherein rotation of the cutting tool holder about the z-axis with respect to the mounting base is restrained, and an angle of inclination θ constituted by an angle formed when a longitudinal axis of the cutter and the z-axis intersect can be maintained at a prescribed angle.

In a preferred embodiment, rotation about the z-axis with respect to the mounting base is restrained while the holder base moves along the z-axis.

In a further preferred embodiment, the X-Y plane and the z-axis are substantially orthogonal to each other.

In another preferred embodiment, the angle of inclination θ can be selected from a prescribed angular range.

In a preferred embodiment, it is possible for the cutting tool holder to be rotated and be restrained about an R-axis constituted by an axis intersecting the Z-axis with respect to the holder base; and the angle of inclination θ can be selected from a prescribed angular range by rotating the cutting tool holder about the R-axis.

In another embodiment, the cutting tool holder can be rotated and restrained about the Z-axis.

In another preferred embodiment, the holder base comprises a main holder base restricting rotation about the Z-axis with respect to the mounting base and a sub-holder base supported at the main holder base and enabling both rotation and restraint about the Z-axis, the cutting tool holder is fitted to the sub-holder base, and rotation and restraining of the cutting tool holder about the Z-axis is possible by rotating and restraining the sub-holder base about the Z-axis with respect to the main holder base.

Further, in a preferred embodiment, the main holder base has a sliding rod fitted to the mounting base with a longitudinal direction coinciding with the Z-axis so as to slide freely in the longitudinal direction, the sub-holder base has a lock mechanism, the sub-holder base is supported so as to be freely rotatable at the sliding rod, and the lock mechanism restrains rotation of the sub-holder base about the sliding rod.

In another preferred embodiment, the tool carriage is a link of an engraver having a pantograph-type link mechanism and engraving an item to be engraved by tracing a master.

DETAILED DESCRIPTION

A first preferred embodiment of a cutter holding assembly and engraver of the present invention is now described based on the drawings.

Figure 1:
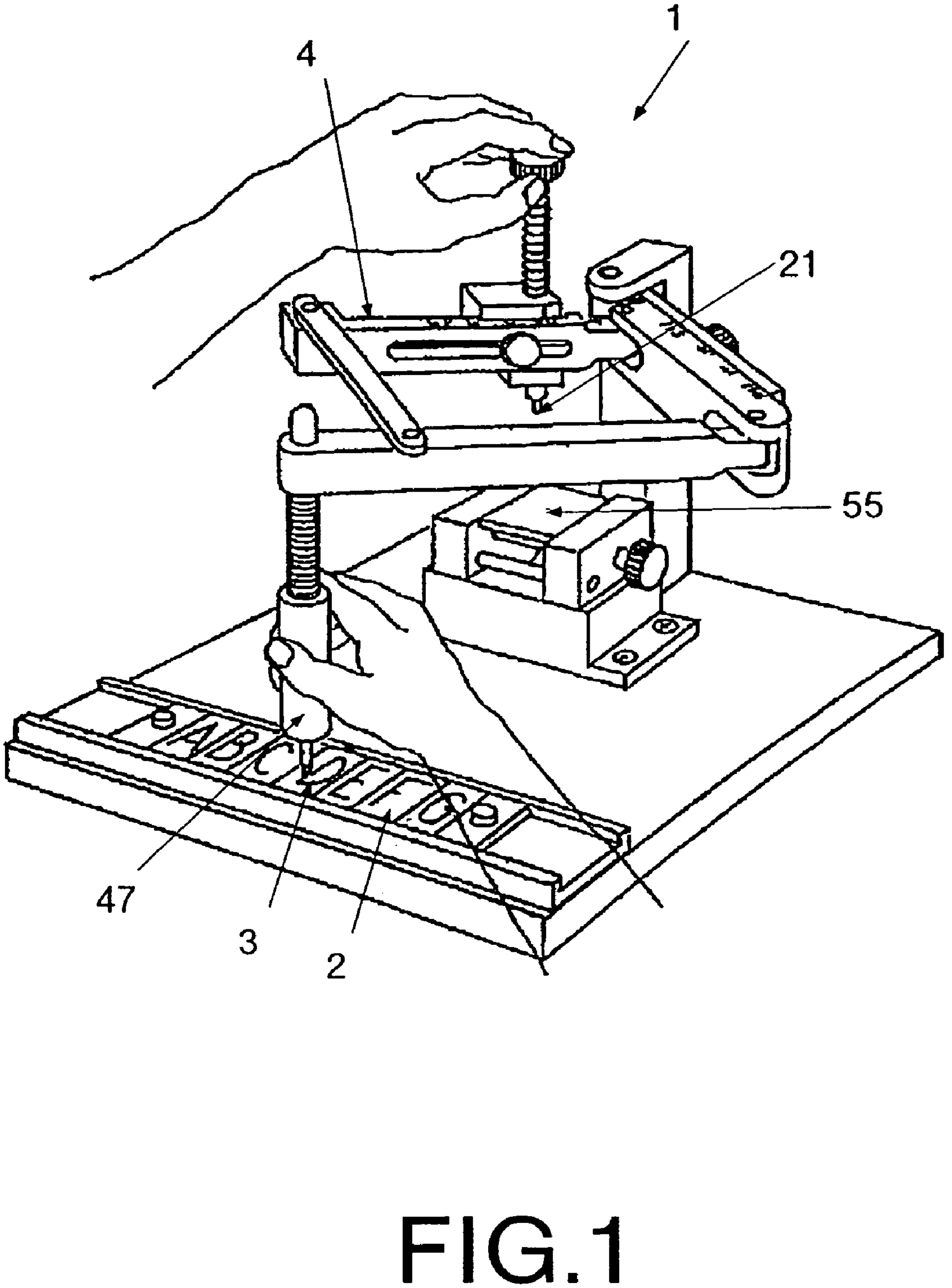
FIG.1 PRIOR ART
FIG. 1 is a perspective view showing a pantograph-type engraver of the related art.
Figure 2:
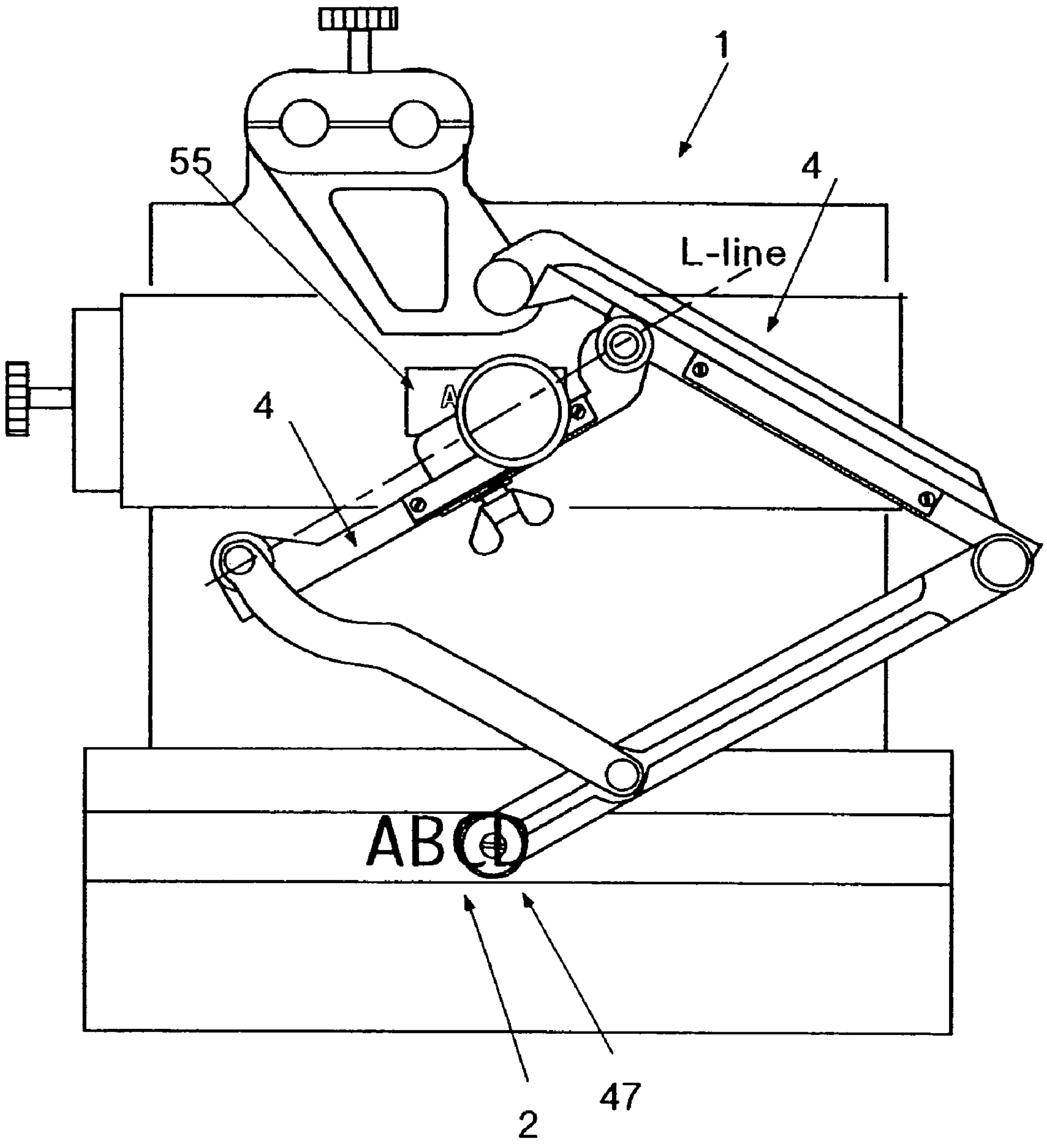
FIG.2 PRIOR ART
FIG. 2 is a plan view of the related assembly.
Figure 3:
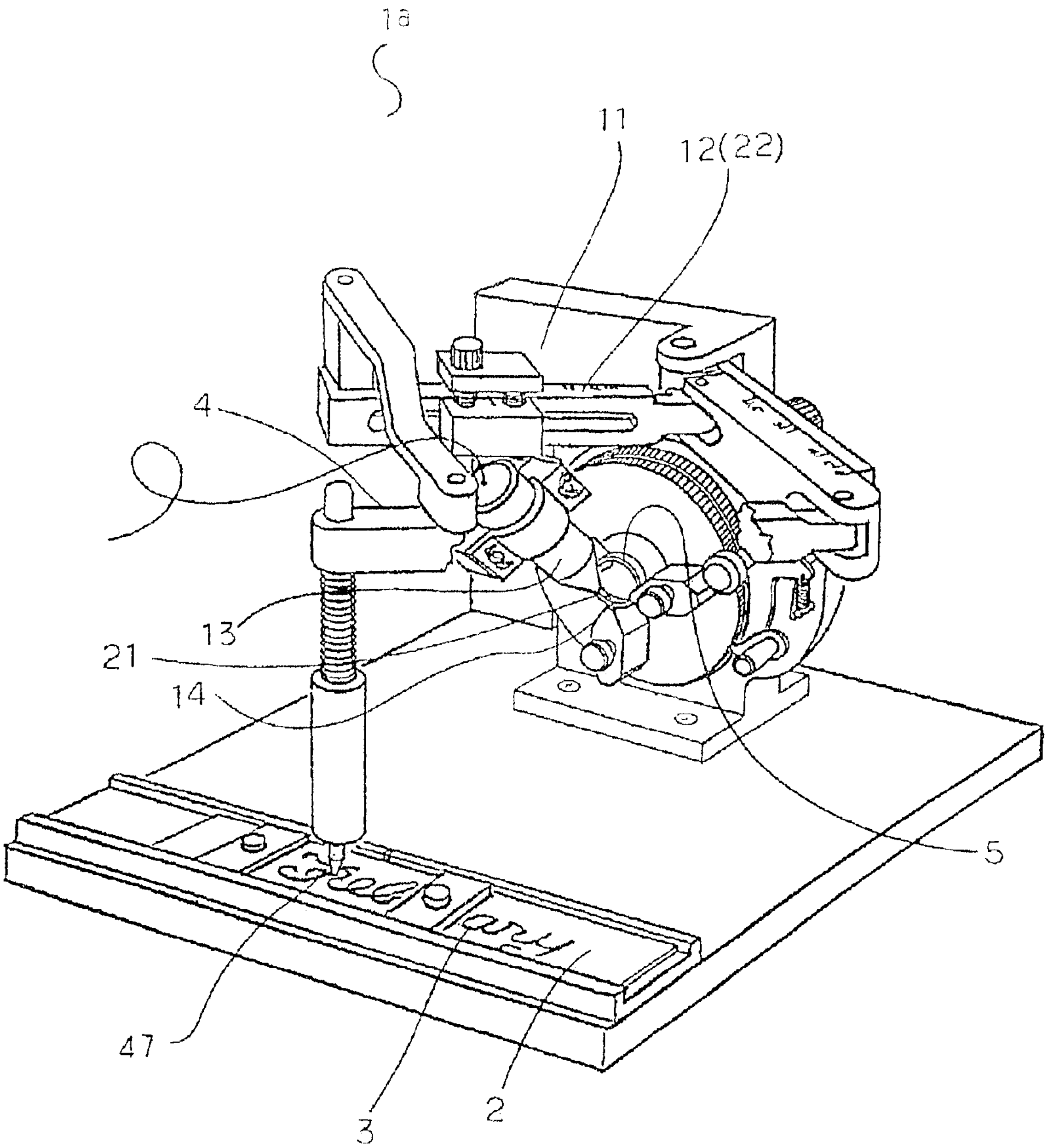
FIG. 3 is a perspective view of a first preferred embodiment of a benchtop engraver.

A first preferred embodiment of a benchtop engraver 1*a* is shown in FIG. 3.

Figure 4:
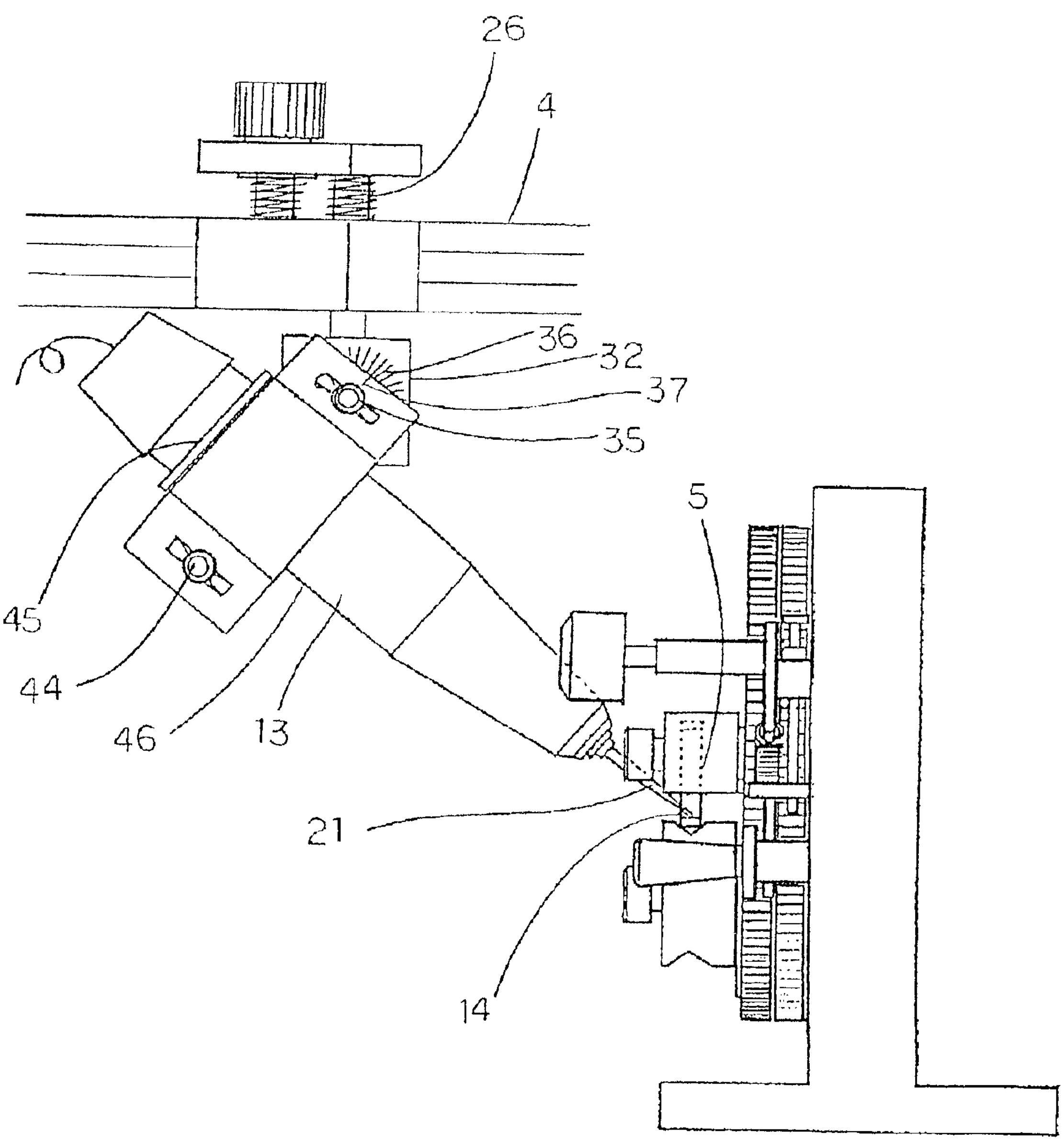
FIG. 4 is a side view of the cutter holding assembly of the first preferred embodiment with a handpiece attached.
Figure 5:
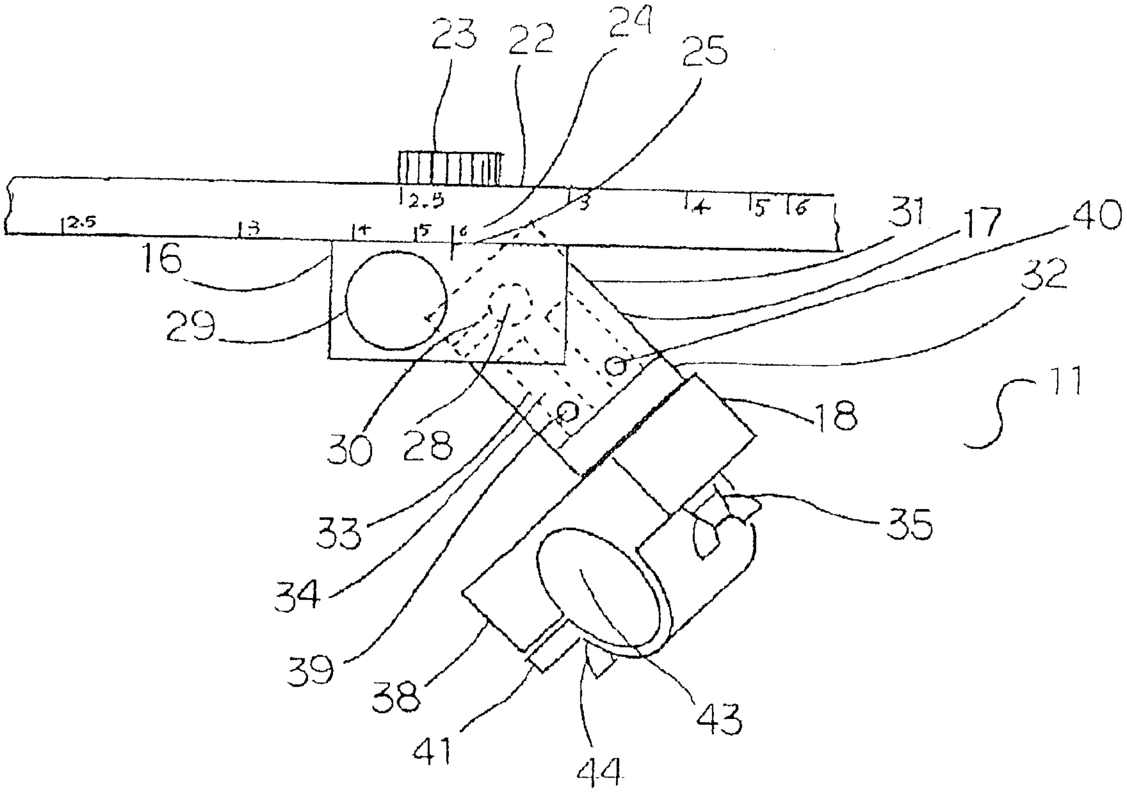
FIG. 5 is a plan view of the cutter holding assembly of the first preferred embodiment.
Figure 6:
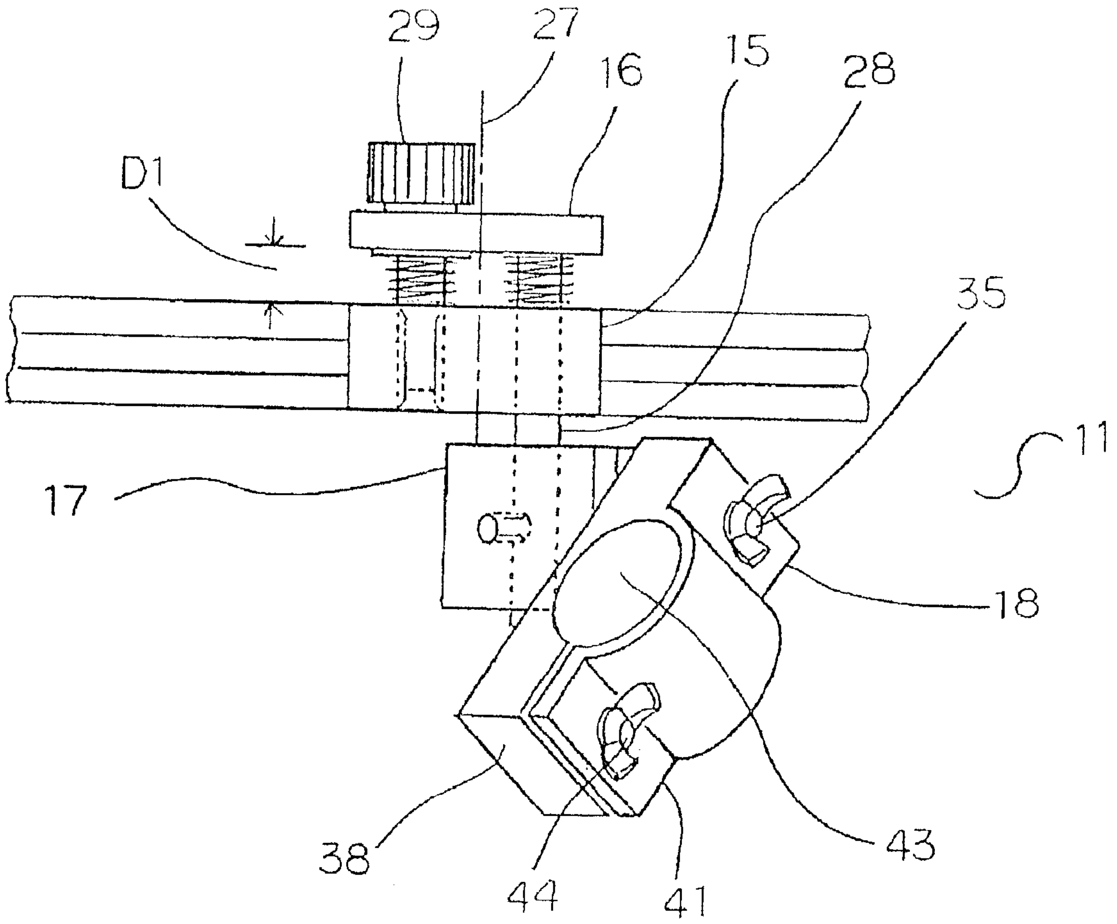
FIG. 6 is a side view of the cutter holding assembly of the first preferred embodiment.

The cutter holding assembly of the first preferred embodiment is shown in FIG. 4 to FIG. 6.

Figure 7:
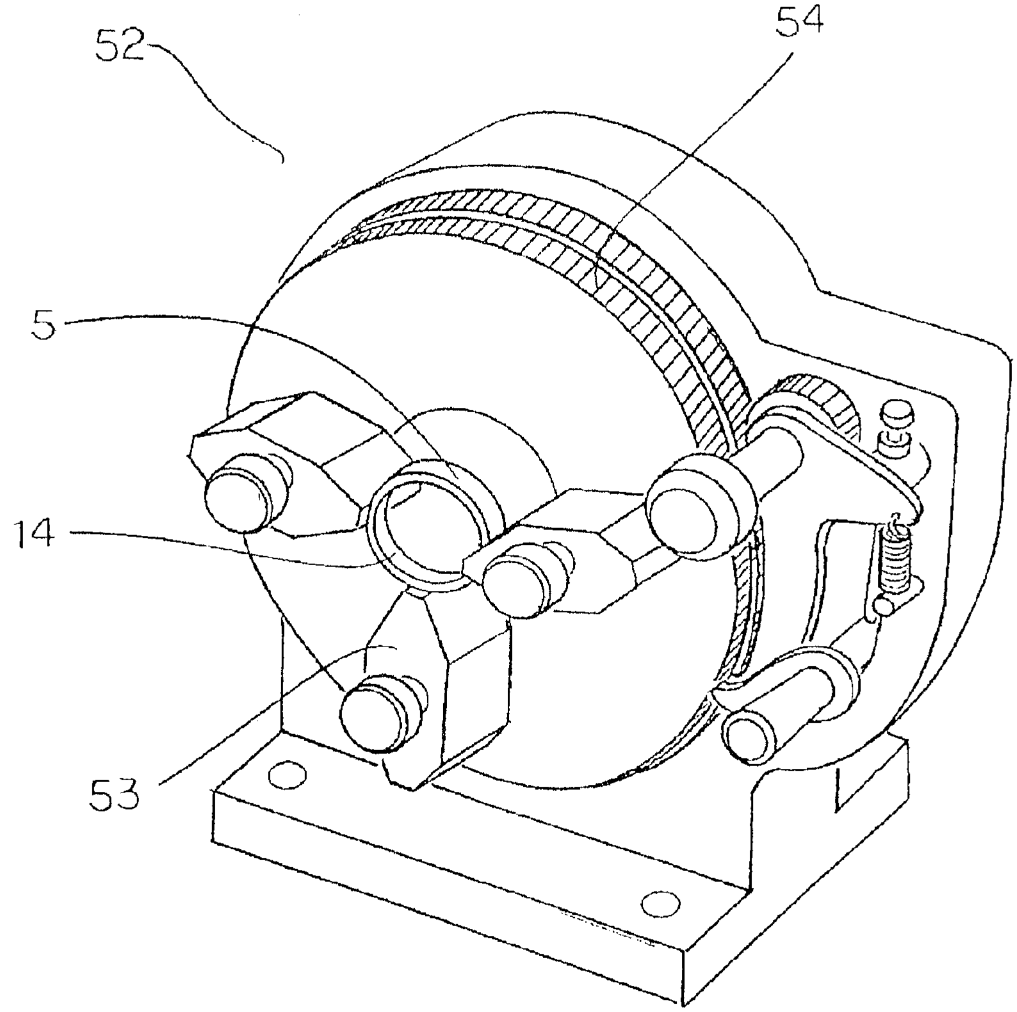
FIG. 7 is a perspective view of a vice assembly.

FIG. 7 shows a vice assembly 52.

A benchtop engraver 1*a* is a machine for engraving items to be engraved. FIG. 3 shows a pantograph-type engraver for reducing characters 3 of copy type 2 or shapes using a pantograph 4 and then engraving the characters or shapes.

In the following, a description is given of an example of a case where the benchtop engraver 1*a* is a pantograph-type engraver and the item to be engraved is a ring.

The benchtop engraver 1*a* is equipped with a cutter holding mechanism 11. The cutter holding mechanism 11 is fitted to a tool carriage 12 of the benchtop engraver 1*a*. The cutter holding mechanism 11 holds an electric handpiece 13 constituting a cutting tool. For example, electric handpiece 13 engraves a part of an inner surface of a ring 5 to be engraved with characters or shapes, etc.

The benchtop engraver 1*a* reduces a trace along the characters 3 of the copy type 2 by a desired scale of reduction and the motion following the trajectory is provided to a cutter 21 of the electric handpiece 13 fitted to the tool carriage 12.

In this embodiment, the tool carriage 12 is constituted by one link 22 of a pantograph 4.

The cutter holding mechanism 11 comprises a mounting base 15, a moving base 16, a holder support 17, and a handpiece holder 18. The mounting base 15 is a member for fitting the cutter holding mechanism 11 to the tool carriage 12 of the benchtop engraver 1*a*. The tool carriage 12 is constituted by one link 22 of the pantograph 4. The mounting base 15 is fitted to a link 22 of the pantograph 4 and is fixed using a screw 23. When the screw 23 is loosened, the mounting base 15 is capable of sliding along a lengthwise direction of the link 22. A scale 24 indicating the rate of reduction is displayed above the link 22. Further, an indication point 25 is fitted to the mounting base 15. The engraving reduction rate can then be decided by aligning the indication point 25 on the mounting base 15 with one of the scales 24 on the link 22. The screw 25 is then fastened after the rate of engraving reduction is decided.

The moving base 16 is fitted to the mounting base 15 via an adjustment screw 29 and a spring 26. A gap between the mounting base 15 and the moving base 16 in the direction of a straight line 27 is referred to as a distance D1. This distance D1 can be finely adjusted using the adjustment screw 29. A support pole 28 extends out downwards from the moving base 16 so as to be parallel with the straight line 27 and passes through the mounting base 15. The holder support 17 is fixed to a lower part of the support pole 28.

The holder support 17 is comprised of a support body 31 and an adjustment table 32.

A stopping screw 30 is provided at the support body 31 and presses the support pole 28. When the stopping screw 30 is loosened, the holder support 17 is capable of sliding along the support pole 28. When the stopping screw 30 is tightened, the holder support 17 is fixed to the support pole 28. When the holder support 17 is slid along the support pole 28, the distance between the holder support 17 and the moving base 16 in the direction of the straight line 27 changes. Further, when the holder support 17 is rotated about the support pole 28, the rotational position of the holder support 17 about the support pole 28 with respect to the moving base 16 changes.

A guide hole 33 is provided at the support body 31. A central axis of the guide hole 33 is perpendicular to the straight line 27. On the other hand, a guide bar 34 extends out from the adjustment table 32. The guide bar 34 is inserted into the guide hole 33. The distance in a direction perpendicular to the straight line 27 of the adjustment table 32 with respect to the support body 31 is changed by the guide bar 34 going in and out along the guide hole 33.

The handpiece holder 18 is fixed to the adjustment table 32 of the holder support 17 by a screw 35. When the screw 35 is loosened, the handpiece holder 18 is capable of being rotated about the axis of the screw 35. When the handpiece holder 18 is made to rotate about the central axis of the screw 35, the rotation ange with respect to the holder support 17 of the handpiece holder 18 changes. When the screw 35 is tightened, the handpiece holder 18 is fixed to the adjustment table 32 of the holder support 17.

A scale 36 is displayed at the adjustment table 32. An indication point 37 is also provided at the handpiece holder 18. A rotation angle for the handpiece holder 18 with respect to the holder support 17 within a plane including the straight line 27 is then selected by lining up the indication point 37 with a point on the scale 36.

The handpiece holder 18 is comprised of a body 38 and a pressing arm 41.A gap 43 is formed between the body 38 and the pressing arm 41. The electric handpiece 13 then inserts into the gap 43. The width of the gap 43 can then be adjusted by rotating the screw 44.

The electric handpiece 13 is fitted by insertion into the gap 43 of the handpiece holder 18. The axial center of the cutter 21 fitted to the end of the electric handpiece 13 is then made to face the surface of the item to be engraved (for example, the inner surface of the ring 5). A sleeve 45 can also be inserted into the gap 43 at this time, if necessary. The sleeve 45 regulates the difference between the diameter of the electric handpiece 13 and the diameter of the gap 43 and ensures that the fitting of the electric handpiece 13 is reliable. The electric handpiece 13 may then be detached by operating the screw 44. The electric handpiece 13 is fitted in such a manner that the cutter 21 at the end of a main section 46 can be exchanged. The cutter 21 is rotatably driven by a micromotor and is driven in a rectilinear reciprocating manner by an ultra-sonic wave generating device. Rotational driving and rectilinear reciprocating driving may then be selected as necessary. The ring 5 constituting the item to be engraved is fitted in a detachable manner to the chucks 53 of a vice assembly 52 shown in FIG. 7. When the ring 5 is rotated by gears 54 of an angle adjustment assembly, the part to be engraved is moved.

The engraving method of this invention is then performed using the engraving assembly of the first preferred embodiment of the configuration.

First, when the screw 23 is loosened and the indication point 25 of the cutter holding mechanism 11 is lined up with the scale 24 of the link 22 of the pantograph 4, the rate of reduction can be decided. Next, when the screw 23 is fastened, the mounting base 15 is fixed to the link 22.

Next, the screw 35 is loosened, and when the indication point 37 is lined up with the scale 36, the angle of inclination of the electric handpiece 13 can be decided. When the screw 35 is tightened, the handpiece holder 18 is fixed to the holder support 17. Next, the stopping screw 30 is loosened, the position in a rectilinear direction and the rotational angle with respect to the support pole 28 of the holder support 17 are adjusted and the cutter 21 of the electric handpiece 13 is made to abut with the inner surface 14 of the ring 5 constituting the item to be engraved. When the stopping screw 30 is tightened, the holder support 17 is fixed to the support pole 28. Next, when the screw 39 and the screw 40 are loosened and the guide bar 34 is made to advance or retreat along the guide hole 33. The position of the handpiece holder 18 in a direction perpendicular to the straight line 27 can be adjusted. When the screws 39 and 40 are tightened, the handpiece holder 18 is fixed to the holder support 17. Next, an adjustment screw 29 is rotated and the moving base 16 is pulled upwards slightly. As a result, the cutter 21 of the electric handpiece 13 comes away slightly from the inner surface 14 of the ring 5.

The preparations for engraving are then complete as a result of the above operation.

The electric handpiece 13 is then activated. After operation is confirmed to be stable, when the adjustment screw 29 is rotated, the moving base 16 descends downwards in the direction of the straight line 27 and the cutter 21 comes into contact with the inner surface 14 of the ring 5 and cuts. The cutting depth of the cutter 21 can then be decided by stopping rotation of the adjustment screw 29. In this way, cutting of the inner surface 14 of the ring 5 by the cutter 21 can begin. When the characters 3 on the copy type 2 are traced using the stylus 47 in this situation, the motion reduced by the pantograph 4 is transmitted to the cutter 21 and the cutter 21 engraves characters reduced from the characters 3 on the copy plate 2 on the inner surface 14 of the ring 5.

Figure 8:
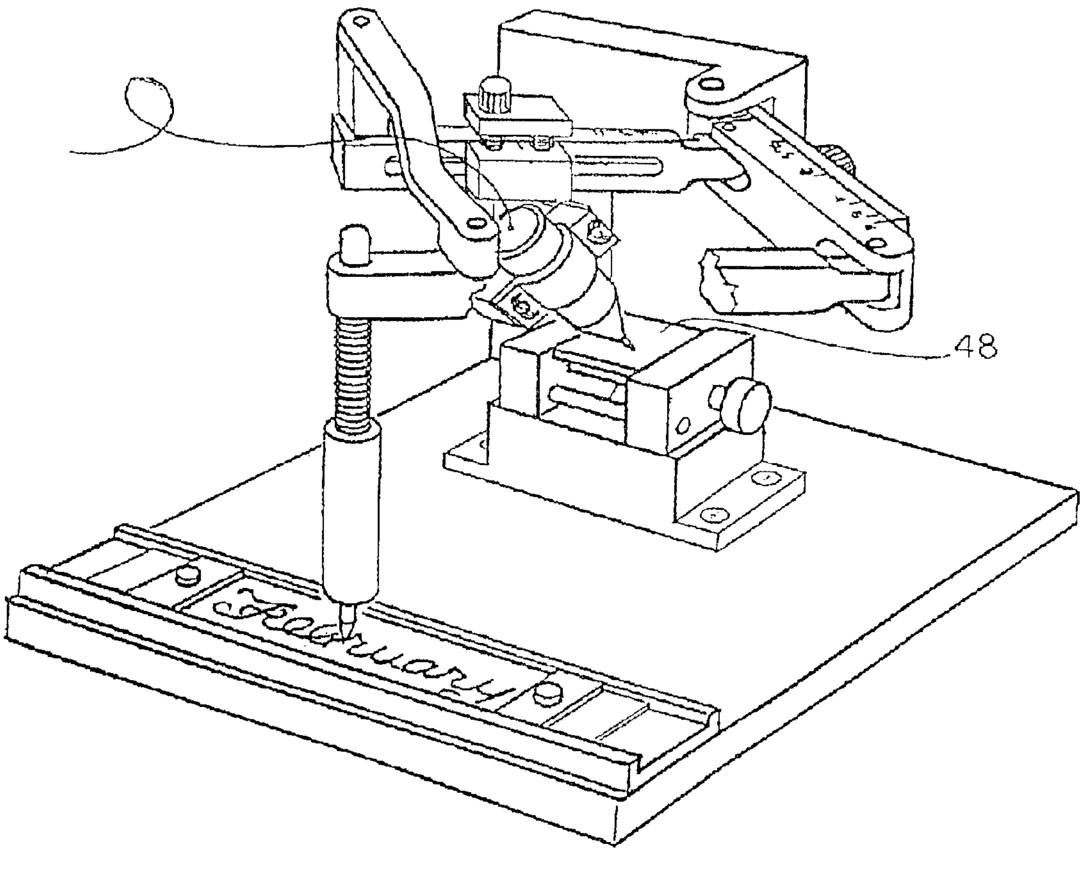
FIG. 8 is a perspective view showing the first preferred embodiment when engraving a flat surface.

In the first preferred embodiment described above, the case is presented where the item to be engraved by the benchtop engraver 1*a* is a ring 5. However, when the part to be engraved of the item to be engraved is flat, engraving is also possible for a flat part to be engraved 48 by changing the posture of the cutter holding mechanism 11 as shown in FIG. 8.

Figure 9:
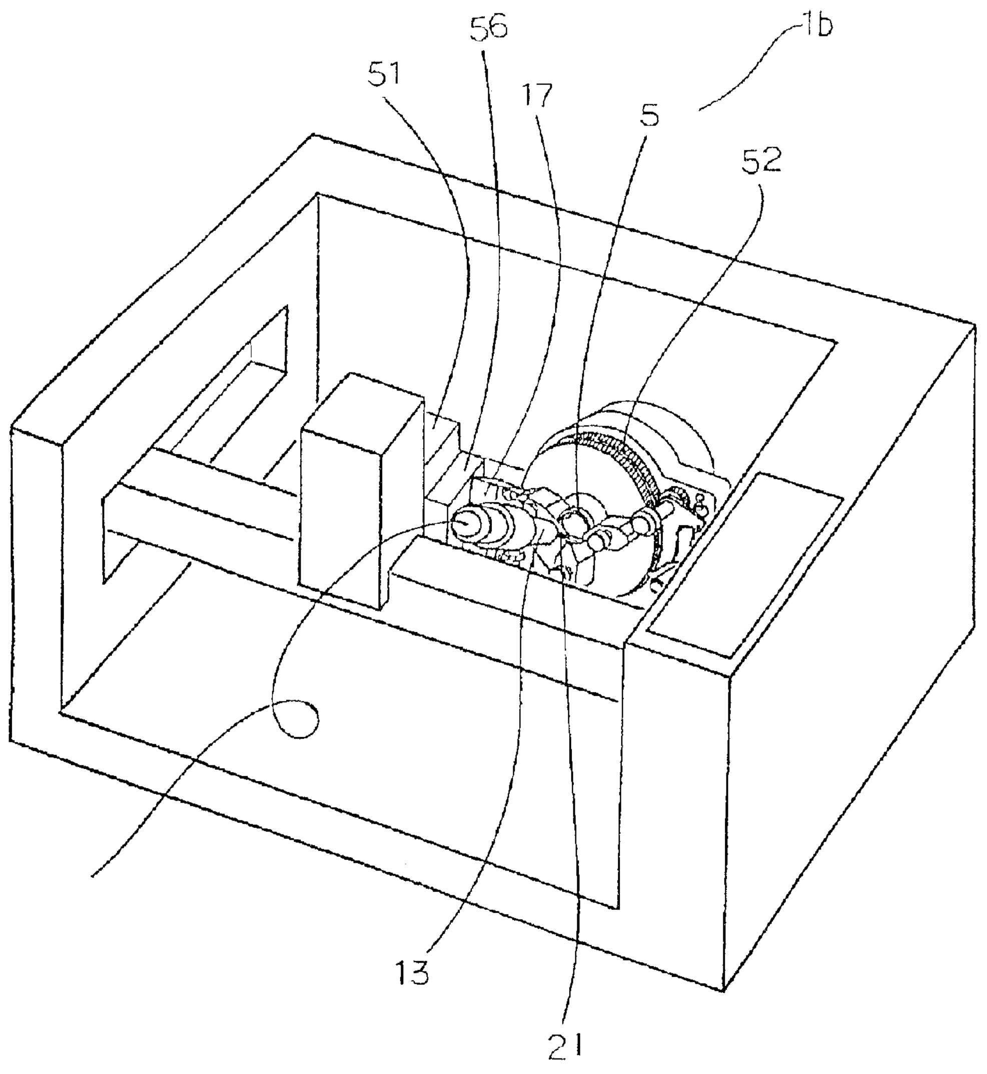
FIG. 9 is a perspective view of the cutter holding assembly of the first preferred embodiment fitted with a personal computer-powered engraver.

Moreover, as shown in FIG. 9, in the case where the benchtop engraver is a computer-controlled benchtop engraver 1*b*, a three-dimensionally moving carriage 51 corresponds to the tool carriage, and an adjustment table 56 for use with a personal computer corresponds to the adjustment table 32. It is also possible for a unit from the adjustment table 56 for use with a personal computer to the cutter 21 to be fitted to the three-dimensionally moving carriage 51 so as to enable engraving in the same manner.

When a related engraver is operated, it is necessary to press a push button with the left hand while firmly pressing a diamond cutter onto the item to be engraved. There is resistance to the pushing of the left hand. It is therefore necessary for the right hand pushing the stylus to apply force in order to trace the copy plate. It is therefore necessary for the material of the copy plate to be hard. For example, a metal or a composite resin may be used as this material. It is also necessary for the grooves of the characters to be deep. This may mean that the end of the stylus cannot be made to go outside the grooves even if the right hand exerts force. Copy plates are expensive which means that only copy plates for characters of standard shapes are at hand. When a person wishes to engrave using a font they like, it is necessary for the user to make a special order for a copy plate. Manufacturing time is therefore substantial in this case and made-to-order copy plates are therefore expensive.

If the first embodiment is employed, metal and other materials are cut by the cutter itself which runs on electricity. It is therefore possible to engrave in a state where light contact is made with the surface of the item to be engraved. It is therefore not necessary to apply pressure and is not necessary to press when tracing the copy type using the stylus. In addition, bearings are built-into the connecting parts of four links of the pantograph to enable a freely moving, smooth operation. In other words, lines simply for guiding the stylus are sufficient for the copy type and it is not necessary for the lines to be deep grooves.

It is therefore possible for the material of the copy type to simply be paper as it is not necessary to make grooves. It is therefore possible to type out characters or style of type using a word processor or personal computer that are currently widespread and to affix such characters or type to appropriate paper using double-sided tape to produce excellent type.

Further, with a related engraver, copy type that is made of expensive material and has deep grooves is used with engraving taking place with characters lined up while being separated one at a time. This, therefore, takes a great deal of time and care has to be taken to position characters used a number of times while changing over the characters, which is both time-consuming and nerve-racking.

According to the engraving assembly of the first embodiment, it is possible to easily type out items to be used as copy type onto a single sheet of paper using a word processor or personal computer. This is both economical and is straightforward because the process can be carried out in order from the start. When desirable characters, marks or patterns etc. are found in existing printed matter, this printed matter can be taken as an original plate and can similarly be utilized by cutting to an appropriate size. The stylus can be moved with the same ease in any direction through three-hundred and sixty degrees.

Further, conventional benchtop engravers could only engrave on flat metal surfaces (gold, silver, platinum, brass, copper, aluminum). Moreover, in addition to being limited, other requirements are that copy type master plates for type styles provided by manufacturers have to be ordered specifically, and manufacture takes a few days and is extremely expensive. Further, the cutter is pushed with the left hand and the copy type is traced with the right hand. This operation where each hand is performing an individual task is therefore nerve-racking, mistakes are common, and skill is required. The linearity of the characters is also monotonous and enjoyment is rare.

When the first embodiment is used, engraving of flat surfaces and of inner and outer surfaces of rings is possible. If a handpiece for use with a micro-motor is assembled, the engraver is capable of engraving on items to be engraved made of materials such as gold, silver, platinum, brass, copper or aluminum, etc. If a handpiece for use with ultrasonic equipment is assembled, the engraver is capable of engraving on items to be engraved made of hard metals made of materials such as steel, stainless steel, molybdenum steel, or titanium, etc.

Paper printed out from a word processor or personal computer or paper for normal printed matter can be installed as is in an original plate holder so as to be used as a copy type master plate.

The mental effort required is also lowered by carrying out the operation with one hand. There is also an abundance of cheap cutters on the market that may be freely used to change the linearity used for enjoyment. The price can also be made extremely cheap.

Further, with the engraving operation for related engravers it is necessary to apply an appropriate amount of pressure with the left hand from start to finish. When the force of the pressure is large, the shape of the characters of the copy plate are not transmitted accurately so as to quiver and become irregular which causes burring. When the force of the pressure is too small, the characters become thin and the thickness becomes noticeably uneven.

Moreover, the resistance of the cutter applies a load to the stylus. The master plate is therefore traced with the stylus using the right hand while taking great care so as to ensure that the stylus does not fly out from the groove. If the stylus comes out of the groove and slips, the path of the stylus will appear clearly as a scratch on the item to be engraved and the product will incur damage.

When the engraving assembly of the first embodiment is used, the angle of inclination of the holder can be adjusted and fixed using a screw at a hand piece holder fitting unit. The tip of the cutter is adjusted and fixed at a position slightly above making contact with the surface of the item to be engraved using a further screw at the fitting unit. Scratches are therefore not caused through error during adjustment and a paper copy plate can be used.

Obviously, it is also possible to install a usual master plate in the master plate holder in place of the paper master plate and perform engraving. During this time, the tip of the stylus can be changed from a ballpoint type to a needle type.

As described above, if the engraving assembly of the first embodiment is used, deep engraving can be easily carried out regardless of whether the shape of the part to be engraved is flat or curved, etc. Moreover, engraving can be achieved in a straightforward manner even at positions on the part to be engraved that are difficult to access. Further, various cross-sectional shapes can be selected as the cross-sectional shape of the engraving groove. It is therefore possible to provide an engraving method, cutter holding apparatus and engraver capable of elegant and expressive engraving.

Next, a description is given with reference to the drawings of a cutter holding assembly of a second preferred embodiment of the present invention. Portions common to each of the drawings are given the same numerals and repeated descriptions are omitted.

Figure 10:
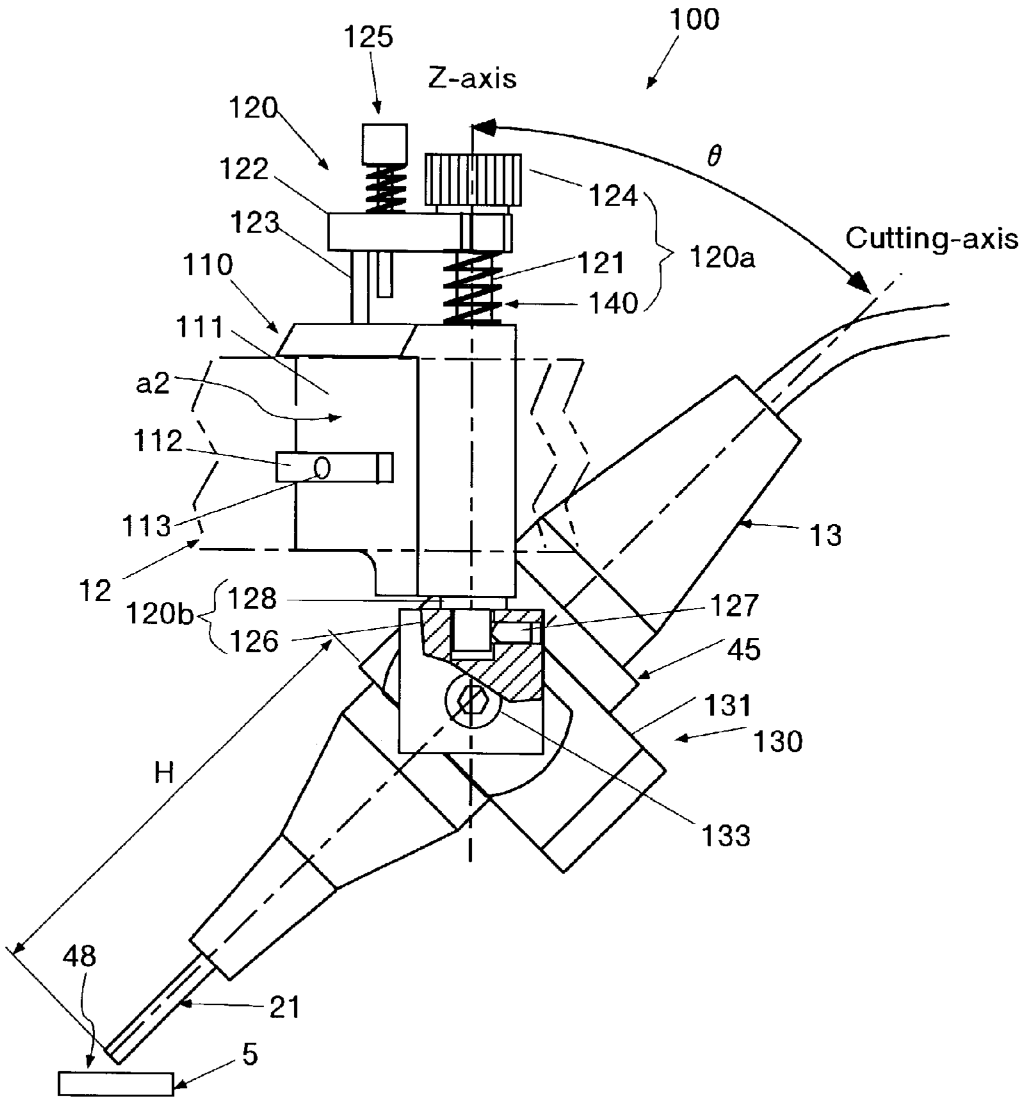
FIG. 10 is a side view of a cutter holding assembly of the second preferred embodiment.
Figure 11:
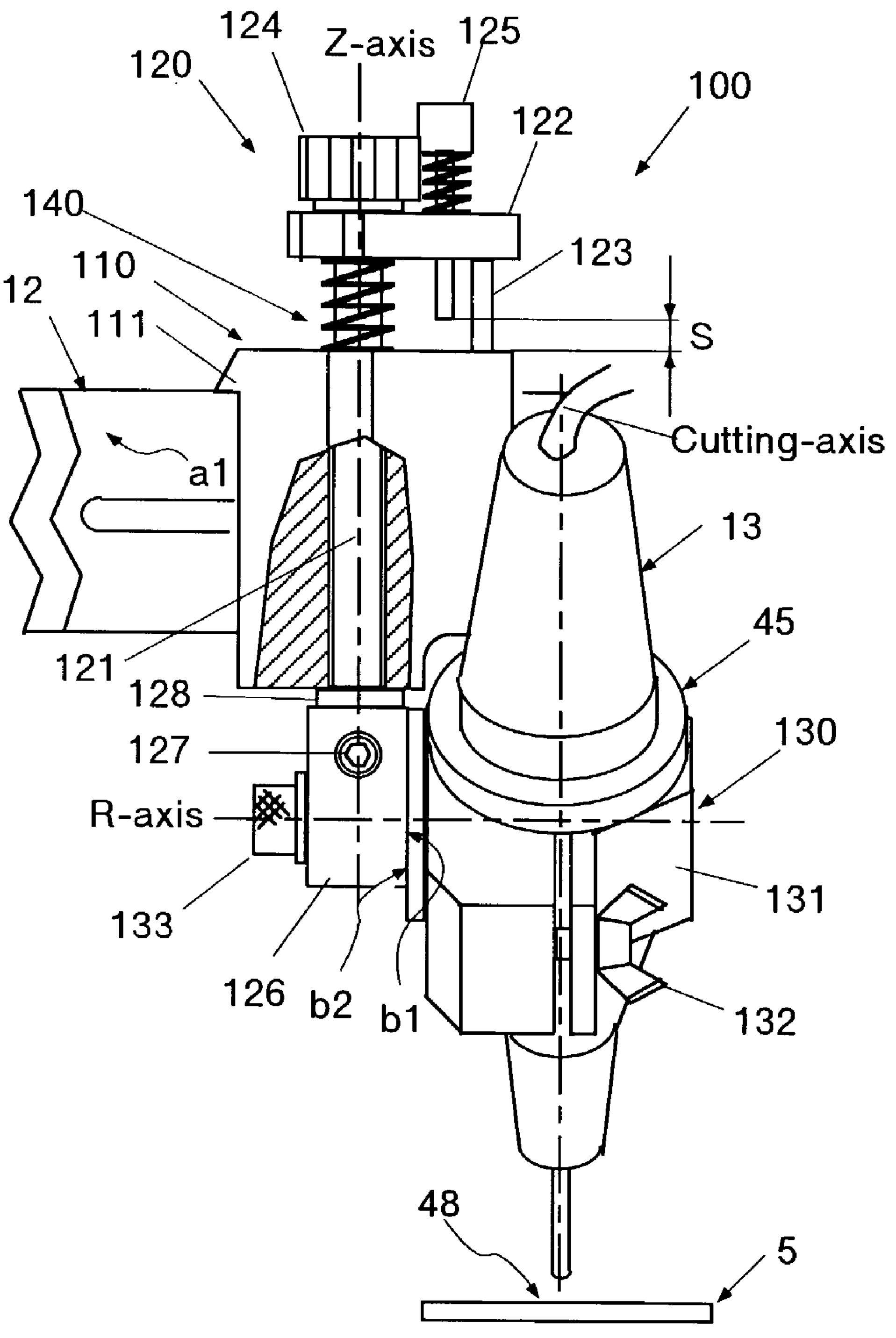
FIG. 11 is a front view of the cutter holding assembly of the second preferred embodiment.
Figure 12:
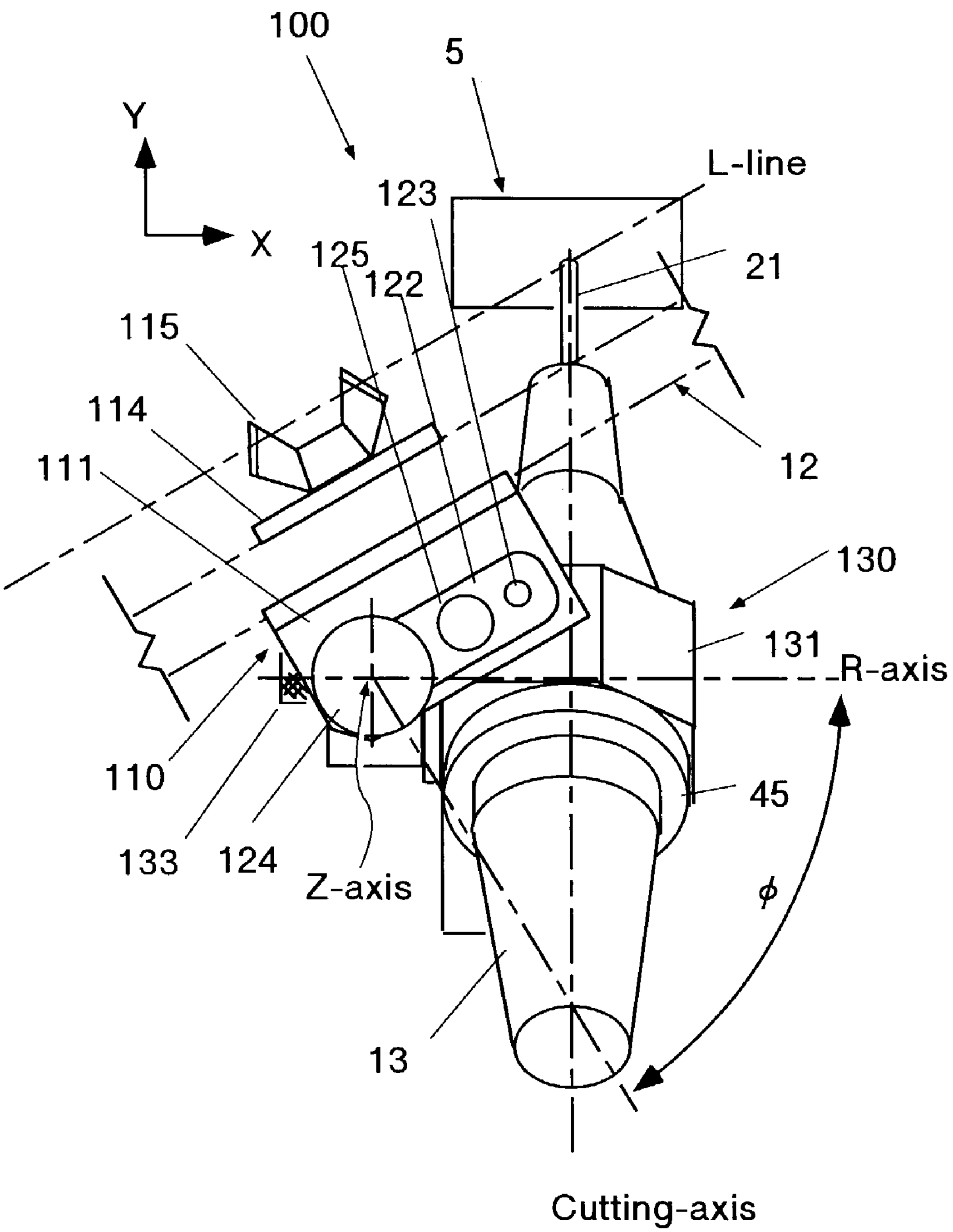
FIG. 12 is a plan view of the cutter holding assembly of the second preferred embodiment.
Figure 13:
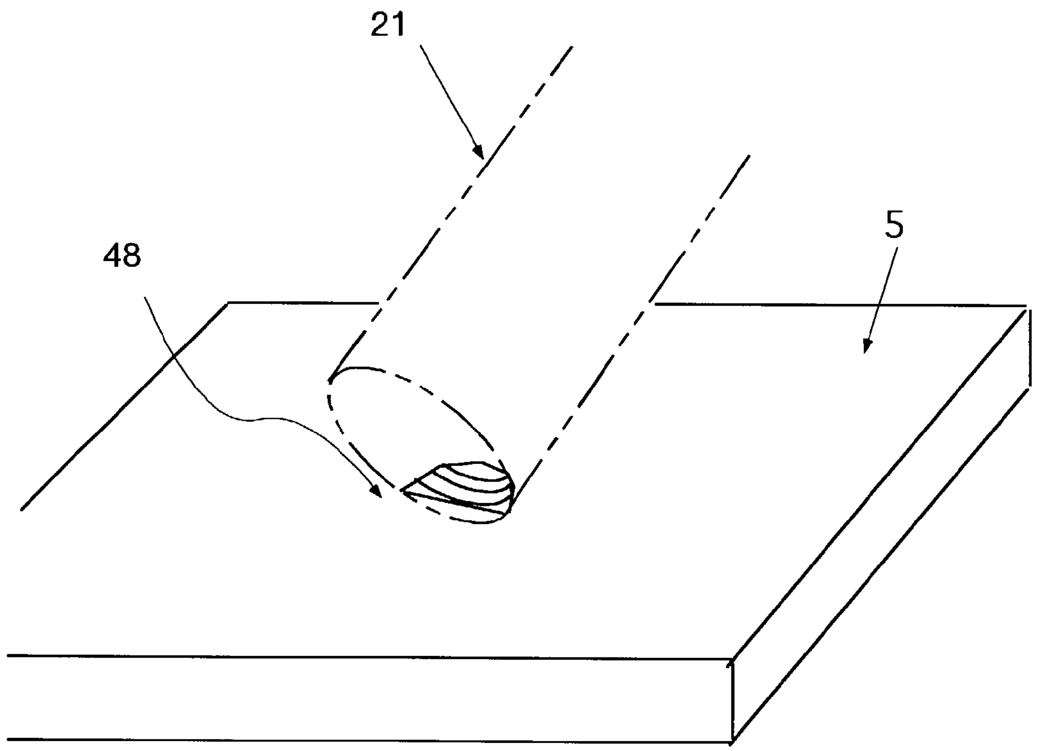
FIG. 13 is a detailed partial view of the cutter holding assembly of the second preferred embodiment.

FIG. 10 is a side view of a cutter holding assembly of the second preferred embodiment of the present invention. FIG. 11 is a front view of the cutter holding assembly of the second preferred embodiment of the present invention. FIG. 12 is a plan view of the cutter holding assembly of the second preferred embodiment of the present invention. FIG. 13 is a partial detailed view of the cutter holding assembly of the second preferred embodiment of the present invention.

A cutter holding assembly 100 is supported at a tool carriage 12 moving in at least an X-Y plane and is an assembly supporting the electric handpiece 13 with respect to the item to be engraved. The cutter holding assembly 100 comprises a mounting base 110, a holder base 120, a cutting tool holder 130 and urging means 140.

The holder base 120 is a member that causes a cutting tool holder 130 (described later) to move in a straight line with respect to the mounting base 110, is supported at the mounting base 110, and moves freely along an axis in the direction of a prescribed straight line (hereinafter referred to as the Z-axis).

The electric handpiece 13 supports a cutter 21 for engraving the item to be engraved.

Below, a description is presented of a example of a case of a link for a pantograph-type engraver engraving items to be engraved by tracing a master with the tool carriage 12 having a pantograph-type link mechanism. Further, the cutter 21 is detachably fitted to the tip of the electric handpiece 13 and a description is presented where the electrically driven cutter 21 being a rotatably driven electric handpiece 13. The electric handpiece 13 is substantially cylindrical in shape with both ends tapering off and has a substantially cylindrical handle section at the center which is capable of being gripped by hand.

The mounting base 110 is a foundation component for fitting the cutter holding assembly 100 to the tool carriage 12 and is fitted to the tool carriage 12. The mounting base 110 is integral with the tool carriage 12 and moves in the X-Y plane.

The mounting base 110 comprises a mounting base body 111, a mounting butterfly bolt 115, and a mounting washer 114.

The mounting base body 111 is a substantially six-sided block having a mounting surface a2, a positioning key 112, and a female fixing thread 113. This block is partially cut-away to prevent mechanical interference.

The positioning key 112 meshes with a key groove provided in the tool carriage 12. The mounting base body 111 is moved in a longitudinal direction of the key groove so that a mounting position can be selected. The mounting surface a2 of the mounting base body 111 and a mounting surface a1 of the tool carriage 12 are lined up facing each other so that the mounting base body 111 and the mounting washer 114 sandwich the tool carriage 12. The mounting butterfly bolt 115 passes through the tool carriage 12 and screws into the female fixing screw 113.

The mounting base body 111 has a through-hole through which a holder base rod 121 constituting part of a holder base 120 (described later) passes. The axial center of the through-hole runs along a Z-axis (described later). The Z-axis is perpendicular to the longitudinal direction of the positioning key 112.

The holder base 120 is a member that causes a cutter holder 130 (described later) to move in a straight line with respect to the mounting base 110, is supported at the mounting base 110, and moves freely along an axis in the direction of a prescribed straight line (hereinafter referred to as the Z-axis).

It is preferable for the X-Y plane and the Z-axis to be substantially orthogonal.

It is also preferable for rotation of the holder base 120 about the Z-axis with respect to the mounting base 110 to be restrained when the holder base 120 is moving along the Z-axis.

It is also preferable for the holder base 120 to be configured from a main holder base 120*a* and a sub-holder base 120*b*. Rotation of the main holder base 120*a* about the Z-axis with respect to the mounting base 110 is restricted. The sub-holder base 120*b* is supported at the main holder base 120*a*. Rotation of the sub-holder base 120*b* about the Z-axis with respect to the main holder base 120*a* can be restricted. The cutting tool holder 130 (described later) is fitted to the sub-holder base 120*b*.

In FIG. 10 to FIG. 12, the main holder base 120*a* comprises the holder base rod (corresponding to the sliding rod) 121, a holder base fixing plate 122, a guide rod 123, a push button 124, and a stroke adjustment screw 125. The sub-holder base 120*b* is shown as comprising a holder base seating plate 126, a holder base stopping screw (corresponding to the lock mechanism) 127, and a holder base collar 128.

The holder base rod 121 is a columnar-shaped member that passes in a freely sliding manner through the through-hole provided at the mounting base body 111, with both ends projecting to outside. The holder base rod 121 moves freely in a straight line along the Z-axis.

The holder base fixing plate 122 is a rectangular plate member with one end fixed to one end of the holder base rod 121 and the other end fixed to the guide rod 123 (described later).

The guide rod 123 is inserted in a freely sliding manner into a long hole with an axial center lined up with the direction of the Z-axis separately provided in the mounting base 110.

Rotation of the holder base rod 121 about the Z-axis is therefore restricted by the holder base fixing plate 122 and the guide rod 123 and rotation of the main holder base 120*a* about the Z-axis with respect to the mounting base 110 is therefore restricted.

The holder base seating plate 126 is a substantially hexahedral block and has a mounting surface b1 fitted with the cutting tool holder 130 (described later). The holder base rod 121 passes through a hole provided in the holder base seating plate 126 and is fixed by the holder base stopping screw 127. The central axis of this hole is parallel with the mounting surface b1.

When the holder base stopping screw 127 is loosened, the sub-holder base 120*b* can be rotated about the Z-axis with respect to the main holder base 120*a*. When the holder base stopping screw 127 is tightened, rotation of the sub-holder base 120*b* about the Z-axis with respect to the main holder base 120*a* can be restricted.

An angle ϕ (hereinafter referred to as direction angleϕ) for a direction of inclination at the X-Y plane of the electric handpiece 13 held by the cutting tool holder 130 can therefore be adjusted.

The stroke adjustment screw 125 can adjust the extent of movement in a straight line of the holder base 120 with respect to the mounting base 110.

FIG. 10 to FIG. 12 show the stroke adjustment screw 125 constituted by a bolt screwed into a female thread provided at the holder base fixing plate 122 with a gap of distance S between the end of the bolt and the mounting base 110.

When the holder base 120 is moved by just a distance S, the stroke adjustment screw 125 collides with the mounting base 110 and further movement is prevented.

The cutting tool holder 130 holds the electric handpiece 13 and is fitted to the holder base 120.

The longitudinal axis of the cutter fixed to the electric handpiece 13 and the Z-axis intersect, with holding taking place to ensure that an angle of intersection θ (hereinafter referred to as inclination angle θ) becomes a prescribed angle.

It is also preferable for the angle of inclination θ to be selected from a prescribed angular range.

It is also particularly preferable for rotation and restriction of the cutting tool holder 130 about an axis (hereinafter referred to as the R-axis) orthogonal to the Z-axis with respect to the holder base 120 to be possible. A prescribed angular range for the angle θ can then be selected by rotating the cutting tool holder about the R-axis.

The cutting tool holder body 131 has a mounting surface b2 and a cutting tool support. The mounting surface b2 is a surface fixed to the holder base 120. The cutting tool support is a portion supporting the electric handpiece 13.

The support position in the longitudinal direction with respect to the cutting tool holder of the electric handpiece 13 can be adjusted and the distance H of projection of the cutter from the cutting tool holder can be adjusted.

FIG. 10 to FIG. 12 show the cutter holder 130 configured from the cutting tool holder body 131, a cutter holder wing bolt 132 and a cutting tool holder fixing bolt 133.

The central axis of the cutting tool supported at the cutting tool holder runs parallel to the mounting surface b2. The cutting tool support is inserted into a sleeve 45. For example, the cutting tool support is a hollow and the sleeve 45 is a circular tube with a brim. The outer diameter of the circular tube is substantially equal to the inner diameter of the hollow and the inner diameter of the circular tube is substantially equal to the outer diameter of the grip of the cutting tool.

A slit is provided at the cutting tool holder body 131 and part of the cutting tool holder body 131 is cut-away.

The cutting tool holder wing bolt 132 is screwed into the cutting tool holder wing bolt 132 so as to be orthogonal to the slit. When the cutting tool holder wing bolt 132 is tightened, the slit narrows and the cutting tool support becomes narrower. Therefore, when the cutting tool holder wing bolt 132 is tightened, the cutting tool holder can support the cutting tool.

When the cutting tool holder wing bolt 132 is loosened, the electric handpiece 13 can be slid in the longitudinal direction in the sleeve 45 and a distance H between the cutting tool holder body 131 and the blade tip of the cutter can be adjusted.

When the cutter holder wing bolt 132 is loosened, the electric handpiece 13 can be slid in the longitudinal direction in the sleeve 45 and a distance H between the cutter holder body 131 and the blade tip of the cutter can be adjusted.

The cutting tool holder fixing bolt 133 passes through the holder base seating plate 126 and is screwed into a female thread provided at the mounting surface b2 of the cutting tool holder body 131. When the cutting tool holder fixing bolt 133 is fastened, the mounting surface b1 of the holder base seating plate 126 and the mounting surface b2 of the cutting tool holder body 131 make contact. The frictional force between the mounting surface b1 and the mounting surface b2 restrains rotation with respect to the holder base seating plate 126 of the cutting tool holder body 131.

The axial center of the cutting tool holder fixing bolt 133 is orthogonal to the mounting surface b2 and coincides with the R-axis.

Rotation and restriction of the cutting tool holder 130 about the R-axis with respect to the holder base 120 is therefore possible. A prescribed angular range for the angle of inclination θ can then be selected by rotating the cutting tool holder 130 about the R-axis.

The electric handpiece 13 with the cutter fixed to the end is covered by the sleeve 45 and is put into the cutting tool support of the cutting tool holder 130.

The urging means 140 is means for urging the holder base 120 in a direction that causes the cutter 21 fixed to the electric handpiece 13 to move away from the item to be engraved 5.

FIG. 10 to FIG. 12 show the urging means 140 constituted by a coiled spring wrapped around the holder base rod 121 provided between the mounting base 110 and the holder base fixing plate 122.

The urging force of the urging means 140 urges the holder base fixing plate 122 in a direction away from the mounting base 110.

Next, the operation of the cutter holding assembly of the second preferred embodiment of the present invention is described.

The electric handpiece 13 with the cutter fixed to the end is covered by the sleeve 45 and is put into the cutting tool support of the cutter holder 130.

The mounting base 110 is fitted to the tool carriage 12 and when the mounting butterfly bolt 115 is fastened, the cutter holding assembly 100 is fixed to the tool carriage 12.

When the stroke adjustment screw 125 is rotated so that the distance S is made a prescribed value, the extent of movement along the Z-axis of the holder base 120 can be decided.

When the holder base stopping screw 127 is loosened, the holder base seating plate 126 can be rotated about the Z-axis. After a prescribed posture is adopted for the holder base seating plate 126, when the holder base stopping screw 127 is fastened, rotation of the holder base seating plate 126 about the Z-axis is restricted, and the direction angle ϕ of the cutting tool holder 130 can be decided.

When the cutter holder fixing bolt 133 is loosened, the cutting tool holder 130 can rotate about the R-axis. After a prescribed posture is adopted for the cutting tool holder 130, when the cutting tool holder fixing bolt 133 is tightened, rotation about the R-axis of the cutting tool holder 130 is fixed, and the angle of inclination θ between the longitudinal axis of the cutter supported by the cutting tool holder 130 and the Z-axis can be decided.

When the cutting tool holder wing bolt 132 is loosened, the cutting tool can be moved along the cutting axis. After the cutting tool is put in a prescribed position, when the cutting tool holder wing bolt 132 is fastened, the distance between the blade tip of the cutter and the part to be engraved of the item to be engraved can be decided.

The electric handpiece 13 can then be electrically driven and the cutter 21 is made to rotate.

When the push button 124 is pressed by hand, the holder base 120 moves along the Z-axis against the urging force of the urging means 140 and the blade tip of the cutter 21 collides with the part to be engraved 48. The cutter 21 then cuts away at the item to be engraved 5 and the item to be engraved is engraved.

It is also possible to give the shape of the engraving a special shape as shown in FIG. 13 by inclining the axis of the cutter with respect to the surface of the part to be engraved 48 during the engraving. When the tool carriage 12 is moved in the X-Y plane, a groove with a cut cross-section of a specific shape can be engraved. For example, when the tool carriage 12 is moved so as to trace prescribed characters, it is possible to engrave characters that are elegant and expressive.

Figure 14:
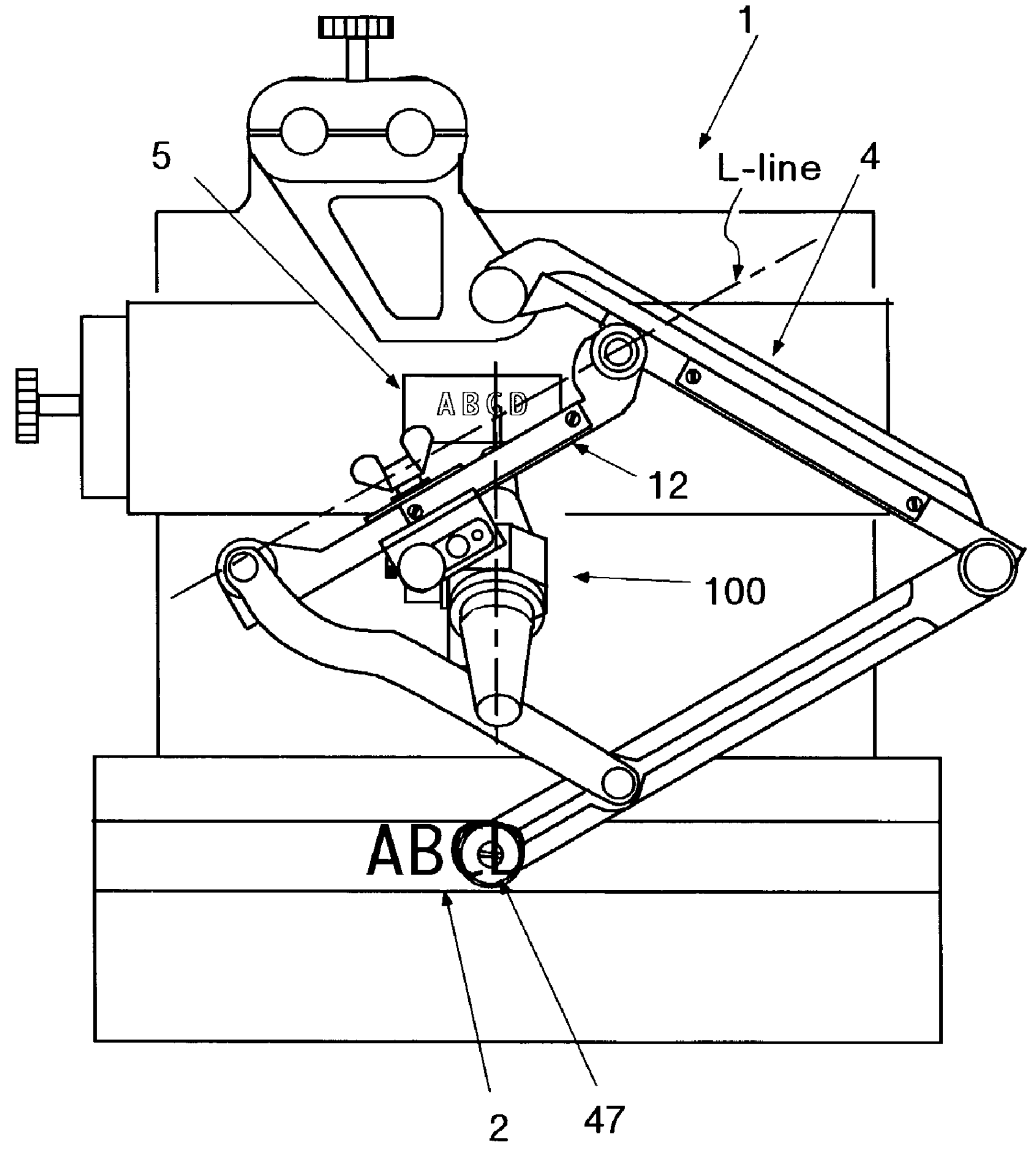
FIG. 14 is an outline view of a first method for operating the cutter holding assembly of the second preferred embodiment.
Figures 15A, 15B:
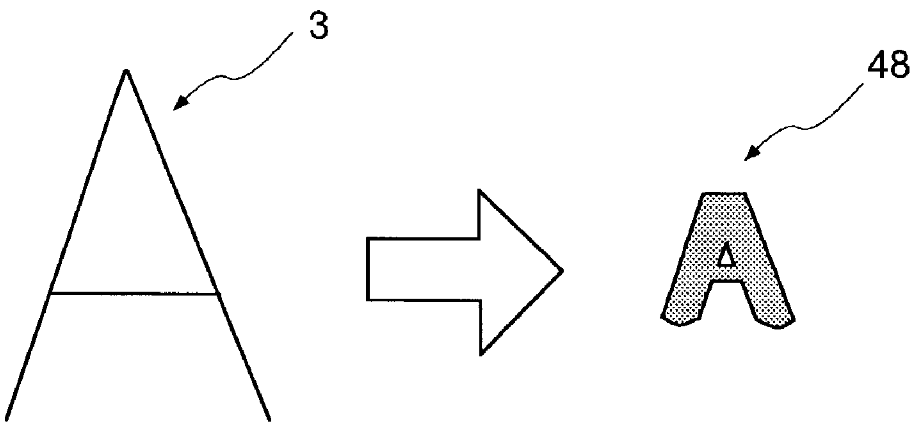
FIG. 15A and FIG. 15B are views of the shapes of engraving made using the first method for operating the cutter holding assembly of the second preferred embodiment.

Next, a description is presented of a first method of operating the cutter holding assembly of the second preferred embodiment of the present invention. FIG. 14 is an outline view of a first method for using the cutter holding assembly of the second preferred embodiment of the present invention. FIG. 15A and FIG. 15B are views of the shapes of engraving made using the first method for operating the cutter holding assembly of the second preferred embodiment of the present invention.

A description is presented where a cutter holding assembly of the preferred embodiments of the present invention is used in a pantograph-type engraver.

For ease of description, movement of the tool carriage in the X-Y plane is taken to be horizontal and the Z-axis is taken to be orthogonal to the X-Y plane.

First, a brief description is given of a pantograph-type engraver.

A pantograph-type engraver is an assembly that has a pantograph-type link mechanism and is for engraving an item to be engraved, and has four links. A stylus is provided at the end of one link. A cutter tool is fitted to another link (corresponding to the tool carriage). An end of another link is fixed in a freely rotatable manner to a base structure fixing the master and the item to be engraved.

When the X-Y plane is viewed from above, it is necessary for the blade tip of the cutting tool to be above a line linking the rotational center of both ends of the tool carriage (hereinafter referred to as line L). When the stylus traces a prescribed trajectory on the master, the blade tip of the cutter follows a trajectory analogous to the prescribed trajectory.

When the blade tip of the cutter is not above a line L, care should be taken because engraving analogous to the master cannot be achieved.

The item to be engraved 48 is placed facing upwards below the blade tip of the cutting tool.

A string of characters “ABCD” are lined up from left to right at the master on which the characters are written.

The angle of inclination θ and the direction angle ϕ are adjusted so that the cutter shaft and the direction of the character string are orthogonal.

The distance H by which the cutter tool 13 projects outwards is then adjusted so that the blade tip of the cutter 21 is on the line L when viewed from above.

FIG. 14 shows a cutter holding assembly surrounded by a pantograph-type link and fixed to the tool carriage from the inside, with the blade tip of the cutter positioned on the line L.

When the master is then traced with the stylus, the character string “ABCD” is engraved in a reduced manner at the part to be engraved 48 of the item to engraved.

The shape of the characters then appears as characters of a typeface written with a thick pen tip.

Regarding the operation of the engraver by a large number of operators, the angle of inclination θ and the direction angle ϕ are adjusted and it is difficult for the cutter blade tip to be adjusted so that the cutter blade tip is on the line L. A number of cutter holding assemblies where the angle of inclination θ and the direction angle ϕ are adjusted and restrained are therefore prepared.

The operators adjust the mounting position of the cutter holding assembly on the tool carriage, set the reduction ratio for tracing the master and perform engraving.

Figure 16:
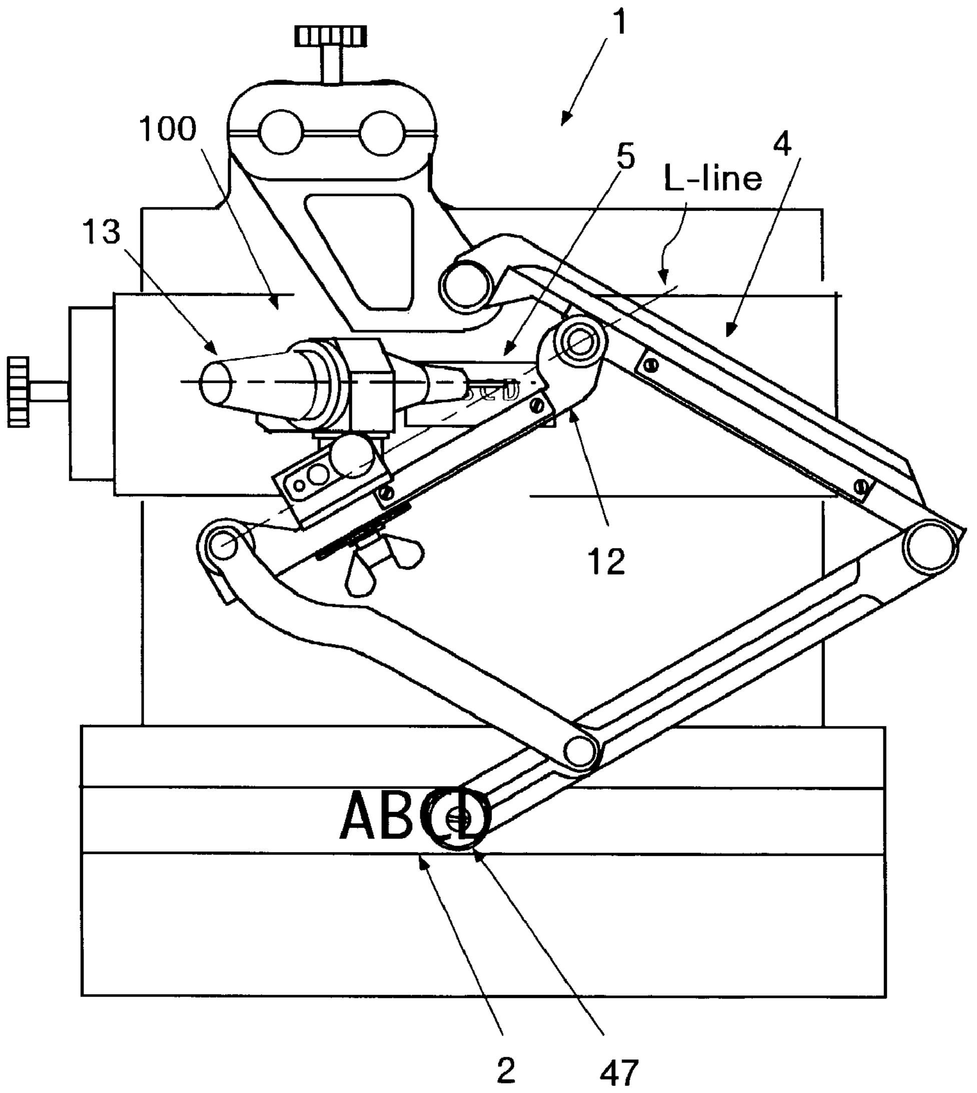
FIG. 16 is an outline view of the second method for operating the cutter holding assembly of the second preferred embodiment.
Figure 17A:
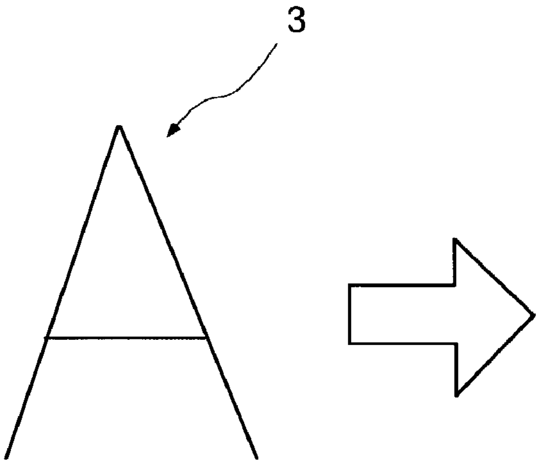
FIG. 17A and FIG. 17B are views of the shapes of engraving made using the second method for operating the cutter holding assembly of the second preferred embodiment.
Figure 17B:
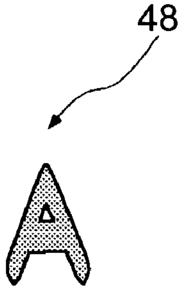

Next, a description is presented of a second method of operating the cutter holding assembly of the second preferred embodiment of the present invention. FIG. 16 is an outline view of a second method for operating the cutter holding assembly of the second preferred embodiment of the present invention. FIG. 17A and FIG. 17B are views of the shapes of engraving made using a second method for operating the cutter holding assembly of the second preferred embodiment of the present invention.

A description is presented where a cutter holding assembly of the second embodiment of the present invention is used in a pantograph-type engraver.

For ease of description, movement of the tool carriage in the X-Y plane is taken to be horizontal and the Z-axis is taken to be orthogonal to the Z-Y plane.

The pantograph-type engraver is the same as for the first method of use and description thereof is therefore omitted.

The angles of inclination θ and ϕ are adjusted so that the cutter shaft and the direction of the character string are parallel.

The distance H by which the cutter tool 13 projects outwards is then adjusted so that the blade tip of the cutter 21 is on the line L when viewed from above.

FIG. 16 shows a cutter holding assembly fixed to the tool carriage from the outside of a pantograph-type link, with the blade tip of the cutter positioned on the line L.

When the master is then traced with the stylus, the character string “ABCD” is engraved in a reduced manner at the part to be engraved 48 of the item to engraved.

The shape of the characters then differs from a bold typeface in being elegant and expressive.

If the cutter holding assembly of the second embodiment is used, the cutting axis is inclined and pressed against the part to be engraved of the item to be engraved while the cutter is moved in the direction of the Z-axis. The shape of the engraving on the part to be engraved can therefore be distinctive and interesting engraving can be produced.

The holder base comprises a main holder base and a sub-holder base. The holder rod of the main holder base is made parallel to the Z-axis. The holder base seating plate of the sub-holder base rotates about the holder base rod and rotation is locked using a holder base stopping screw. It is therefore extremely simple to rotate the cutting tool holder fixed to the sub-holder base about the Z-axis to adjust the direction angle ϕ.

The cutting tool holder fixing bolt passing through the holder base seating plate of the sub-holder base is perpendicular to the Z-axis, rotation of the cutting tool holder about the R-axis constituting the axis of the cutting tool holder fixing bolt is restricted, and the angle of inclination θ for the cutting axis and the Z-axis can easily be adjusted.

Further, the Z-axis is orthogonal with the X-Y plane. Engraving can therefore be achieved where the tool carriage can be moved over a broader surface of the part to be engraved by moving the item to be engraved so that the item to be engraved becomes parallel with the X-Y plane.

Further, it is also possible to provide interesting engraving where the part to be engraved of the item to be engraved can have variety with distinctive cross-sections by appropriately selecting the direction angle ϕ and the angle of inclination θ.

Further, the holder rod stopped from turning by the guide rod is able to slide on the mounting base. It is therefore possible to move the holder base in the direction of the Z-axis with a simple configuration.

The cutting tool is supported by the cutting tool holder of the cutter holder assembly. The extent of insertion to the cutting tool holder of the cutting tool can therefore be adjusted, the distance H or protrusion of the cutter can be regulated, and the position of the blade tip of the cutter can be adjusted.

In the second embodiment of the present invention described above, a cutter holder assembly for holding a cutting tool supported at a tool carriage moving in at least an X-Y plane and provided with a cutter for engraving an item to be engraved has a configuration that gives the following results.

The cutter holding assembly is provided with an angle of inclination θ for the direction of sending the cutter (Z-axis) and the axial center of the cutter. When the cutter is then pushed against the item to be engraved along the Z-axis while the tool carriage is moved in the X-Y plane, the longitudinal axis of the cutter and the Z-axis are inclined by just an angle of inclination θ. The cutter then moves in an X-Y plane while colliding with the item to be engraved and engraving of individualistic shapes on the item to be engraved can be achieved.

Rotation of the holder base and the mounting base about the Z-axis is restricted. When the cutter is then pushed against the item to be engraved along the Z-axis while the tool carriage is moved in the X-Y plane, the longitudinal axis of the cutter and the Z-axis are inclined by just an angle of inclination θ. The cutter then moves in an X-Y plane while abutting with the item to be engraved and engraving of individualistic shapes on the item to be engraved can be achieved.

Further, the X-Y plane and the Z-axis are substantially orthogonal. Therefore, if the surface to be engraved of the item to be engraved is positioned in the X-Y plane, when the cutter is pushed against the item to be engraved along the Z-axis while the tool carriage is moved in the X-Y plane, the tip of the cutter blade of the cutter abuts with the surface to be engraved of the item to be engraved at an angle of inclination of just θ and unique shapes can therefore be engraved on the surface to be engraved.

Further, the angle of inclination θ can be selected from a prescribed angular range. The tip of the cutter blade of the cutter collides with the surface to be engraved of the item to be engraved at an angle of inclination of just θ and the surface to be engraved can be engraved using special shapes with a good deal of variation.

It is possible to rotate and restrict rotation of the cutting tool holder about the R-axis with respect to the holder base. This makes it possible to adjust the angle of inclination θ in a straightforward manner by rotating the cutting tool holder with respect to the holder base.

Further, it is possible to both rotate and restrict rotation of the cutting tool holder about the Z-axis. The direction of inclination of the cutting tool can therefore be changed, the blade tip of the cutter can be made to abut with the surface to be engraved of the item to be engraved, and distinct shapes with a great deal of variation can be engraved in the surface to be engraved.

Moreover, the sub-holder base is supported in a rotatable manner at the main holder base and the cutting tool holder is fixed to the sub-holder base. It is therefore possible to adjust the direction of inclination of the cutting tool just by rotating the sub-holder base about the Z-axis with respect to the main holder base. The direction of inclination of the cutter abutting with the item to be engraved can therefore be easily adjusted and unique shapes with a wide variety of variation can therefore be selected for engraving on the item to be engraved.

Further, it is possible to restrict rotation about the sliding rod of the sub-holder base using the lock mechanism. The direction of inclination of the cutting tool can therefore be easily adjusted simply by rotating the sub-holder base about the sliding rod. The direction of inclination of the cutter colliding with the item to be engraved can therefore be simply selected and unique shapes can be easily selected with a wide degree of variation for engraving on the item to be engraved.

By providing an engraver having a pantograph-type link mechanism with the cutter holding device of the present invention, engraving having a wide variety of specific shapes with a great deal of variation can be provided on the engraving surface.

It is therefore possible to provide a cutter holding assembly for an engraver capable of implementing engraving technology that is not limited with regards to parts to be engraved and that can produce a wide variation of engraving.

The present invention is by no means limited to that described above and various modifications are possible while remaining within the scope of the present invention as disclosed in the claims of the present invention.

The example presented is of usage in a pantograph engraver, but the usage method is by no means limited in this respect and may also be used, for example, in a personal computer-type engraver.

A description is also presented of rotating a cutter using an electrically driven cutting tool but the present invention is by no means limited in this respect and may for example, a cutter driven by vibration.

Further, a description is presented where a cutting tool that is held by hand is employed as a hand tool but the present invention is by no means limited in this respect and, for example, an electrically powered tool dedicated to use with a cutter holding assembly may also be employed.

I claim:

1. A cutter holder assembly for holding a cutting tool supported at a tool carriage, the cutting tool moving in at least an X-Y plane and provided with a cutter for engraving an item to be engraved, said assembly comprising:

- a mounting base capable of being fitted to the tool carriage;
- a holder base supported at the mounting base in such a manner as to be freely movable with respect to the mounting base along a Z-axis provided in direction of a prescribed straight line; and
- a cutting tool holder supporting the cutting tool and being fixed to the holder base,
- wherein rotation of the cutting tool holder about the z-axis with respect to the mounting base is restrained, and
- an angle of inclination θ constituted by an angle formed when a longitudinal axis of the cutter and the z-axis intersect can be held at a prescribed angle.

2. The cutter holding assembly as disclosed in claim 1, wherein rotation of the holder base about the z-axis with respect to the mounting base is restrained while the holder base moves along the z-axis.

3. The cutter holding assembly as disclosed in claim 1, wherein the X-Y plane and the z-axis are substantially orthogonal to each other.

4. The cutter holding assembly as disclosed in claim 1, wherein the angle of inclination θ can be selected from a prescribed angular range.

5. The cutter holding assembly as disclosed in claim 1, wherein it is possible for the cutter holder to be rotated and be restrained about an R-axis constituted by an axis intersecting the Z-axis with respect to the holder base; and the angle of inclination θ can be selected from a prescribed angular range by rotating the cutter holder about the R-axis.

6. The cutter holding assembly as disclosed in claim 1, wherein the cutter holder can be rotated and restrained about the Z-axis.

7. The cutter holding assembly as disclosed in claim 1, wherein the holder base comprises a main holder base restricting rotation about the Z-axis with respect to the mounting base and a sub-holder base supported at the main holder base and enabling both rotation and restraint about the Z-axis, the cutter holder is fitted to the sub-holder base, and rotation and restraining of the cutter holder about the Z-axis are possible by rotating and restraining the sub-holder base about the Z-axis with respect to the main holder base.

8. The cutter holding assembly as disclosed in claim 7, wherein the main holder base has a sliding rod fitted to the mounting base with a longitudinal direction coinciding with the Z-axis so as to slide freely in the longitudinal direction, the sub-holder base has a lock mechanism, the sub-holder base is supported so as to be freely rotatable at the sliding rod, and the lock mechanism restrains rotation of the sub-holder base about the sliding rod.

9. The cutter holding assembly as disclosed in claim 1, wherein the tool carriage is a link of an engraver having a pantograph-type link mechanism and engraving an item to be engraved by tracing a master.

* * * * *